(12) United States Patent
Liang et al.

(10) Patent No.: US 11,734,075 B2
(45) Date of Patent: Aug. 22, 2023

(54) REDUCING DATA FORMAT CONVERSION OF AN ACCELERATOR

(71) Applicant: INTERNATIONAL BUSINESS MACHINES CORPORATION, Armonk, NY (US)

(72) Inventors: Qi Liang, Shanghai (CN); Yi Xuan Zhang, Shanghai (CN); Gui Yu Jiang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/534,536

(22) Filed: Nov. 24, 2021

(65) Prior Publication Data

US 2023/0161624 A1 May 25, 2023

(51) Int. Cl.
*G06F 9/30* (2018.01)
*G06F 9/38* (2018.01)
(Continued)

(52) U.S. Cl.
CPC ............ *G06F 9/5027* (2013.01); *G06F 7/483* (2013.01); *G06F 9/30025* (2013.01);
(Continued)

(58) Field of Classification Search
CPC .. G06F 9/30025; G06F 9/3838; G06F 9/3877; G06N 3/063
See application file for complete search history.

(56) References Cited

U.S. PATENT DOCUMENTS

| | | | |
|---|---|---|---|
| 6,085,203 A | 7/2000 | Ahlers et al. | |
| 2012/0204005 A1* | 8/2012 | Dockser | G06F 9/3814 712/205 |

(Continued)

FOREIGN PATENT DOCUMENTS

| | | |
|---|---|---|
| CN | 11117625 A | 5/2020 |
| WO | 2021/087841 A1 | 5/2021 |

OTHER PUBLICATIONS

Abdel-Aziz, H. et al., "Rethinking Floating Point Overheads for Mixed Precision DNN Accelerators", https://arxiv.org/abs/2101.11748, published Jan. 27, 2021 (17 pages) (Year: 2021).

(Continued)

*Primary Examiner* — Jacob Petranek
(74) *Attorney, Agent, or Firm* — Teddi Maranzano, Esq.; Kevin P. Radigan, Esq.; Heslin Rothenberg Farley & Mesiti P.C.

(57) ABSTRACT

Data format conversion processing of an accelerator accessed by a processor of a computing environment is reduced. The processor and accelerator use different data formats, and the accelerator is configured to perform an input conversion to convert data from a processor data format to an accelerator data format prior to performing an operation using the data, and an output conversion to convert resultant data from accelerator data format back to processor data format after performing the operation. The reducing includes determining that adjoining operations of a process to run on the processor and accelerator are to be performed by the accelerator, where the adjoining operations include a source operation and destination operation. Further, the reducing includes identifying for removal output data format conversion of output data of the source operation for input to the destination operation, and input data format conversion of the input to the destination operation.

17 Claims, 16 Drawing Sheets

(51) Int. Cl.
  *G06F 9/50* (2006.01)
  *G06N 3/063* (2023.01)
  *G06F 7/483* (2006.01)
(52) U.S. Cl.
  CPC .......... *G06F 9/3838* (2013.01); *G06F 9/3877* (2013.01); *G06N 3/063* (2013.01)

(56) References Cited

U.S. PATENT DOCUMENTS

| | | | |
|---|---|---|---|
| 2018/0330239 | A1* | 11/2018 | Chen ................ G06N 3/00 |
| 2020/0193273 | A1* | 6/2020 | Chung ............... G06F 9/54 |
| 2020/0193274 | A1* | 6/2020 | Darvish Rouhani ... G06F 17/15 |
| 2020/0226454 | A1 | 7/2020 | Cambier et al. |
| 2020/0250523 | A1 | 8/2020 | Ren et al. |
| 2020/0264876 | A1* | 8/2020 | Lo ................... G06N 3/084 |
| 2020/0279153 | A1* | 9/2020 | Fowers ............... G06N 3/08 |
| 2021/0072955 | A1 | 3/2021 | Nekkenoydu et al. |
| 2021/0200474 | A1 | 7/2021 | Yang et al. |

OTHER PUBLICATIONS

Carilli, M. et al., "Training Neural Networks with Mixed Precision", GPU Technology Conference, https://on-demand.gputechconf.com/gtc-taiwan/2018/pdf/5-1_Internal%20Speaker_Michael%20Carilli_PDF%20For%20Sharing.pdf (77 pages) (Year: 2018).

IBM Publication, "z/Architecture Principles of Operation," IBM® Publication No. SA22-7832-12, 13th Edition, Sep. 2019 (pp. Jan. 2000) (Year: 2019).

Mel et al., "The NIST Definition of Cloud Computing," National Institute of Standards and Technology, Information Technology Laboratory, Special Publication 800-145, Sep. 2011 (pp. 1-7) (Year: 2011).

Narang, S. et al., "Mixed Precision Training", https://arxiv.org/abs/1710.03740, v3 [cs.AI], published Feb. 15, 2018 (12 pages) (Year: 2018).

IBM Publication, "z/Architecture Principles of Operation," IBM® Publication No. SA22-7832-12, 13th Edition, Sep. 2019 (Chapter 7, pp. 7-229 to 7-739) (Year: 2019).

IBM Publication, "z/Architecture Principles of Operation," IBM® Publication No. SA22-7832-12, 13th Edition, Sep. 2019 (Chapter 9, pp. 9-3 to 9-24; Chapter 9, pp. 9-27 to 9-30) (Year: 2019).

IBM Publication, "z/Architecture Principles of Operation," IBM® Publication No. SA22-7832-12, 13th Edition, Sep. 2019 (Chapter 18, pp. 18-11 to 18-12) (Year: 2019).

IBM Publication, "z/Architecture Principles of Operation," IBM® Publication No. SA22-7832-12, 13th Edition, Sep. 2019 (Chapter 19, pp. 19-19 to 19-26) (Year: 2019).

IBM Publication, "z/Architecture Principles of Operation," IBM® Publication No. SA22-7832-12, 13th Edition, Sep. 2019 (Chapter 20, pp. 20-24 to 20-37) (Year: 2019).

International Search Report & Written Opinion for PCT Application No. PCT/CN2022/130601, dated Jan. 11, 2023 (9 pages).

* cited by examiner

REDUCE DATA FORMAT CONVERSION PROCESSING OF AN ACCELERATOR ACCESSED BY A PROCESSOR OF THE COMPUTING ENVIRONMENT, THE PROCESSOR AND ACCELERATOR USING DIFFERENT DATA FORMATS, AND THE ACCELERATOR BEING CONFIGURED TO PERFORM, IN PART, AN INPUT DATA FORMAT CONVERSION TO CONVERT RECEIVED DATA FROM A PROCESSOR DATA FORMAT TO AN ACCELERATOR DATA FORMAT PRIOR TO PERFORMING AN OPERATION USING THE DATA, AND AN OUTPUT DATA FORMAT CONVERSION TO CONVERT RESULTANT DATA FROM THE ACCELERATOR DATA FORMAT BACK TO THE PROCESSOR DATA FORMAT AFTER PERFORMING THE OPERATION ~700

DETERMINE THAT ADJOINING OPERATIONS OF A PROCESS TO RUN ON THE PROCESSOR AND ACCELERATOR ARE TO BE PERFORMED BY THE ACCELERATOR, THE ADJOINING OPERATIONS INCLUDING A SOURCE OPERATION AND A DESTINATION OPERATION ~702

IDENTIFY FOR REMOVAL, BASED ON THE DETERMINING, OUTPUT DATA FORMAT CONVERSION OF OUTPUT DATA OF THE SOURCE OPERATION FOR INPUT TO THE DESTINATION OPERATION AS INPUT DATA, AND INPUT DATA FORMAT CONVERSION OF THE INPUT DATA FOR THE DESTINATION OPERATION ~704

WHERE THE REDUCING FURTHER INCLUDES REMOVING, BASED ON THE IDENTIFYING, THE OUTPUT DATA FORMAT CONVERSION OF OUTPUT DATA OF THE SOURCE OPERATION FOR INPUT TO THE DESTINATION OPERATION AS INPUT DATA, AND THE INPUT DATA FORMAT CONVERSION OF THE INPUT DATA FOR THE DESTINATION OPERATION ~706

INCLUDING ASSOCIATING A RESPECTIVE CONVERT_INPUT PARAMETER WITH INPUT DATA FORMAT CONVERSIONS OF THE ACCELERATOR, AND A RESPECTIVE CONVERT_OUTPUT PARAMETER WITH OUTPUT DATA FORMAT CONVERSIONS OF THE ACCELERATOR, WHERE THE IDENTIFYING INCLUDES SETTING THE CONVERT_OUTPUT PARAMETER ASSOCIATED WITH THE OUTPUT DATA FORMAT CONVERSION OF THE OUTPUT DATA FROM THE SOURCE OPERATION TO FALSE, AND SETTING THE CONVERT_INPUT PARAMETER ASSOCIATED WITH THE INPUT DATA FORMAT CONVERSION OF THE INPUT DATA FOR THE DESTINATION OPERATION TO FALSE, AND WHERE THE REDUCING INCLUDES BLOCKING THE OUTPUT DATA FORMAT CONVERSION OF THE OUTPUT DATA FROM THE SOURCE OPERATION BASED ON THE CONVERT_OUTPUT PARAMETER BEING FALSE, AND BLOCKING THE INPUT DATA FORMAT CONVERSION OF THE INPUT DATA FOR THE DESTINATION OPERATION BASED ON THE CONVERT_INPUT PARAMETER BEING FALSE ~708

FIG. 7A

WHERE THE DESTINATION OPERATION RECEIVES MULTIPLE INPUT DATA FROM MULTIPLE SOURCES, ONE SOURCE OF THE MULTIPLE SOURCES BEING THE ADJOINING SOURCE OPERATION TO BE PERFORMED BY THE ACCELERATOR, AND ANOTHER SOURCE OF THE MULTIPLE SOURCES BEING AN OPERATION TO EXECUTE ON THE PROCESSOR, WHERE THE INPUT DATA RECEIVED FROM THE PROCESSOR IS TO UNDERGO INPUT DATA FORMAT CONVERSION BY THE ACCELERATOR, WHILE THE INPUT DATA RECEIVED FROM THE ACCELERATOR IS NOT TO UNDERGO INPUT DATA FORMAT CONVERSION BY THE ACCELERATOR ~710

WHERE THE DESTINATION OPERATION PROVIDES MULTIPLE DATA OUTPUTS, ONE DATA OUTPUT OF THE MULTIPLE DATA OUTPUTS HAVING A RESPECTIVE CONVERT_OUTPUT PARAMETER ASSOCIATED THEREWITH THAT IS TRUE, MEANING THAT THE OUTPUT IS TO UNDERGO OUTPUT DATA FORMAT CONVERSION TO CONVERT FROM ACCELERATOR DATA FORMAT TO PROCESSOR DATA FORMAT, AND ANOTHER OUTPUT OF THE MULTIPLE DATA OUTPUTS HAS A RESPECTIVE CONVERT_OUTPUT PARAMETER THAT IS FALSE, MEANING THAT THAT OUTPUT IS NOT TO UNDERGO OUTPUT DATA FORMAT CONVERSION TO CONVERT FROM THE ACCELERATOR DATA FORMAT TO THE PROCESSOR DATA FORMAT ~712

WHERE THE MULTIPLE DATA OUTPUTS OF THE DESTINATION OPERATION ARE PROVIDED BY COPYING A DATA OUTPUT TO PROVIDE THE ONE DATA OUTPUT TO BE PROVIDED TO AN OPERATION ON THE PROCESSOR AND THE OTHER DATA OUTPUT TO BE PROVIDED TO AN OPERATION ON THE ACCELERATOR ~714

WHERE THE PROCESSOR DATA FORMAT IS A HIGHER-PRECISION DATA FORMAT THAN THE ACCELERATOR DATA FORMAT ~716

WHERE THE PROCESSOR DATA FORMAT IS A FIRST FLOATING-POINT DATA FORMAT, AND THE ACCELERATOR DATA FORMAT IS A SECOND FLOATING-POINT DATA FORMAT ~718

WHERE THE ACCELERATOR IS AN ARTIFICIAL INTELLIGENCE (AI) ACCELERATOR ASSOCIATED WITH THE PROCESSOR, AND ALONG WITH THE PROCESSOR, PART OF A SINGLE, MIXED-PRECISION PROCESSING DEVICE ~720

FIG. 7B

REDUCING DATA FORMAT CONVERSION OF AN ACCELERATOR

BACKGROUND

One or more aspects relate, in general, to facilitating processing within a computing environment, and in particular, to improving such processing.

According to enhanced processing in computing environments that are data and/or computational-intensive, artificial intelligence (AI) accelerators are utilized, such as neural network accelerators. Such accelerators provide a great deal of compute power used in performing, for instance, involved computations, such as computations on matrices or tensors.

Tensor computations, as an example, are used in complex processing, including deep learning, which is a subset of machine learning. Deep learning or machine learning, an aspect of artificial intelligence, is used in various technologies, including but not limited to, engineering, manufacturing, medical technologies, automotive technologies, computer processing, etc.

To perform artificial intelligence (AI) workloads, including tensor computations, and matrix multiplications, a software implementation can be used that executes many instructions on a general purpose processor, or uses a purpose-build hardware implementation. Using many instructions on a general purpose process can limit the performance of the neural network operations, while a purpose-built hardware implementation may need to be modified and recompiled for each hardware generation, increasing complexity and verification costs.

SUMMARY

Certain shortcomings of the prior art are overcome and additional advantages are provided through the provision, in one or more aspects, of a computer program product for facilitating processing within a computing environment. The computer program product includes one or more computer-readable storage media having program instructions embodied therewith. The program instructions are readable by a processing circuit to cause the processing circuit to perform a method which includes reducing data format conversion processing of an accelerator accessed by a processor of the computing environment. The processor and accelerator use different data formats, and the accelerator is configured to perform, in part, an input data format conversion to convert received data from a processor data format to an accelerator data format prior to performing an operation using the data, and an output data format conversion to convert resultant data from the accelerator data format back to the processor data format after performing the operation. The reducing includes determining that adjoining operations of a process to run on the processor and accelerator are to be performed by the accelerator, where the adjoining operations include a source operation and a destination operation. The reducing also includes identifying for removal, based on the determining, output data format conversion of the output of the source operation for input to the destination operation as input data, and input data format conversion of the input data for the destination operation. Advantageously, the reducing data format conversion processing of the accelerator enhances processing within the computing environment and improves overall performance by reducing accelerator processing, which reduces accelerator inference processing time and enhances throughput.

In one or more embodiments, the reducing further includes removing, based on the identifying, the output data format conversion of output data of the source operation for input to the destination operation as input data, and the input data format conversion of the input data for the destination operation. Removing selected data format conversions advantageously reduces data format conversion processing of the accelerator, and thereby reduces accelerator training and inference processing time.

In one or more embodiments, the method further includes associating a respective convert_input parameter with input data format conversions of the accelerator, and a respective convert_output parameter with output data format conversions of the accelerator, where the identifying includes setting the convert_output parameter associated with the output data format conversion of the output data from the source operation to FALSE, and setting the convert_input parameter associated with the input data format conversion of the input data for the destination operation to FALSE. The reducing includes blocking the output data format conversion of the output data from the source operation based on the convert_output parameter being FALSE, and blocking the input data format conversion of the input data for the destination operation based on the convert_input parameter being FALSE. Blocking selected data format conversions of the accelerator from occurring enhances processing within the computing environment and improves overall performance by reducing accelerator processing, which reduces accelerator training time and inference processing time.

In one example, the destination operation receives multiple input data from multiple sources, one source of the multiple sources being the adjoining source operation to be performed by the accelerator, and another source of the multiple sources being an operation to execute on the processor. The input data received from the processor is to undergo input data format conversion by the accelerator, while the input data received from the accelerator is not to undergo input data format conversion by the accelerator. Advantageously, selectively reducing data format conversion processing of the accelerator enhances processing within the computing environment by reducing accelerator processing, which reduces accelerator training time and inference processing time.

In an example, the destination operation provides multiple data outputs, one data output of the multiple data outputs having a respective convert_output parameter associated therewith that is TRUE, meaning that the output is to undergo output data format conversion to convert from accelerator data format to processor data format, and another output of the multiple data outputs has a respective convert_output parameter that is FALSE, meaning that the output is not to undergo output data format conversion to convert from the accelerator data format to the processor data format.

In one example, the multiple data outputs of the destination operation are provided by copying (or shadowing) a data output to provide the one data output to be provided to an operation on the processor, and the other data output to be provided to an operation on the accelerator.

In one example, the processor data format is a higher-precision data format than the accelerator data format. As an example, the processor data format is a first floating-point data format, and the accelerated data format is a second floating-point data format.

In one embodiment, the accelerator is an artificial intelligence (AI) accelerator associated with the processor, and along with the processor, part of a single, mixed-precision processing device.

Computer systems and computer-implemented methods relating to one or more aspects are also described and claimed herein. Further, services relating to one or more aspects are also described and may be claimed herein.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 7A-7B depict a further embodiment of a workflow illustrating certain aspects of one or more embodiments of the present invention;

DETAILED DESCRIPTION

Figure 1A:
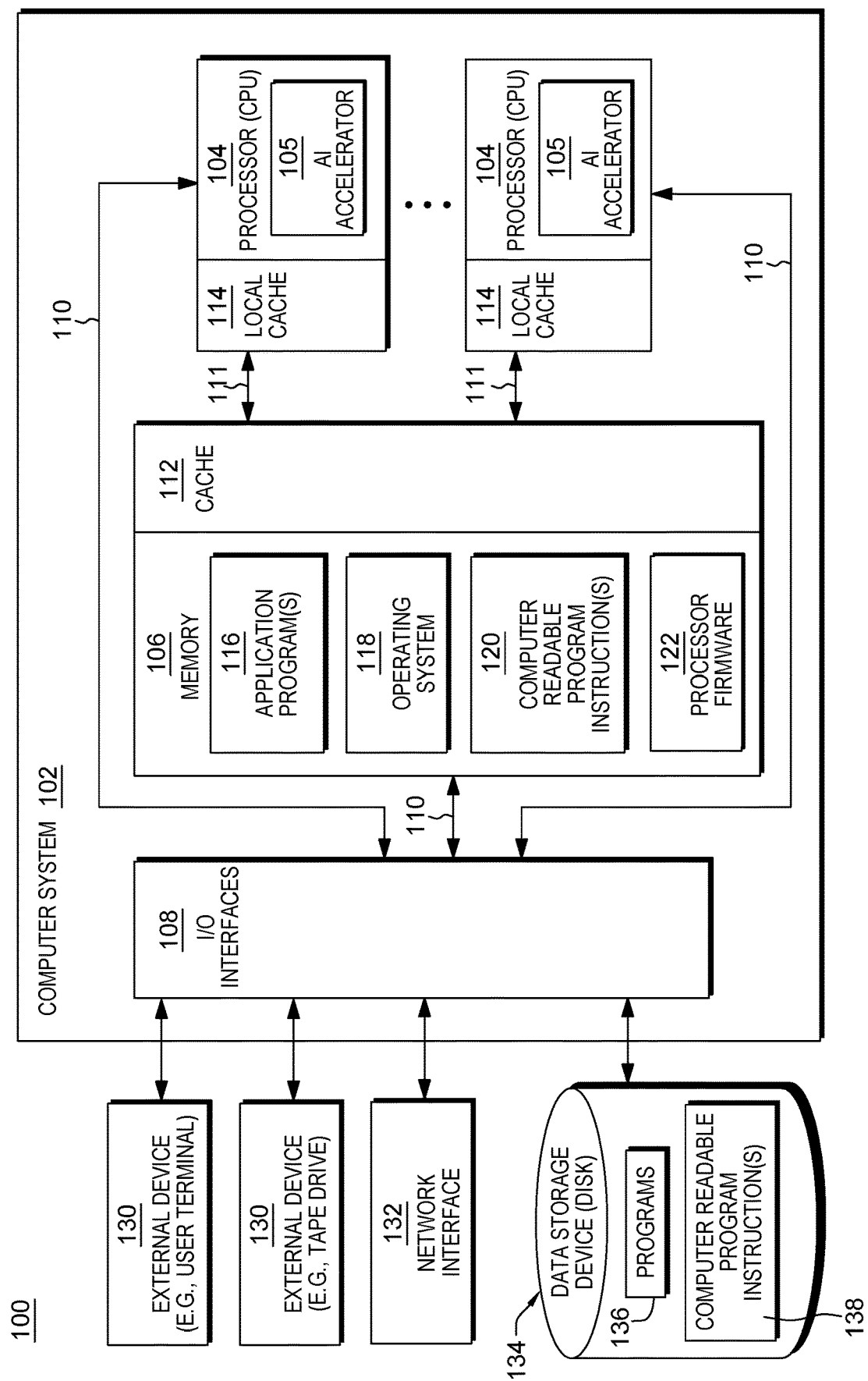
FIG. 1A depicts one example of a computing environment to incorporate and use one or more aspects of the present invention.

The accompanying figures, in which like reference numerals refer to identical or functionally similar elements throughout the separate views, and which are incorporated in and form a part of this specification, further illustrate the present invention and, together with the detailed description of the invention, serve to explain aspects of the present invention. Note in this regard that descriptions of well-known systems, devices, accelerators, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further, that numerous inventive aspects and features are disclosed herein, and unless inconsistent, each disclosed aspect or feature is combinable with any other disclosed aspect or feature as desired for a particular application of the concepts disclosed herein.

Note also that illustrative embodiments are described below using specific code, designs, architectures, accelerators, protocols, layouts, schematics or tools, only as examples, and not by way of limitation. Further, the illustrative embodiments are described in certain instances using particular hardware, software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both hardware and software. For example, program code in certain embodiments of the present invention can include fixed function hardware, but other embodiments can utilize a software-based implementation of the functionality described. Certain embodiments combine both types of program code. One example of program code, also referred to as one or more programs or program instructions, is depicted in FIG. 1A as one or more of application program(s) 116, computer-readable program instruction(s) 120, and/or processor firmware 122, stored in memory 106 of computer system 102, as well as programs 136 and computer-readable program instruction(s) 138, stored in a data storage device 134 accessed by computer system 102.

In accordance with one or more aspects of the present invention, a capability is provided to facilitate processing within a computing environment. As an example, data format conversion processing is reduced within an accelerator accessed by a processor of the computing environment. In one embodiment, the accelerator is an artificial intelligence (AI) accelerator (or non-AI accelerator) associated with the processor, and along with the processor, is part of a single, mixed-precision processing device. Advantageously, reducing data format conversion processing of the accelerator enhances processing within the computing environment, and improves overall performance by reducing accelerator processing, which reduces accelerator training and inference processing time, and thereby enhances throughput.

One embodiment of a computing environment to incorporate and use one or more aspects of the present invention is described with reference to FIG. 1A. As an example, the computing environment is based on the IBM® z/Architecture® instruction set architecture, offered by International Business Machines Corporation, Armonk, N.Y. One embodiment of the z/Architecture instruction set architecture is described in a publication entitled, "z/Architecture Principles of Operation", IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more general-purpose processors or processing units 104 (e.g., central processing units (CPUs)), at least one special-purpose processor, such as an artificial intelligence (AI) accelerator 105 associated with a respective general-purpose processor 104, a memory 106 (a.k.a., system memory, main memory, main storage, central storage or storage, as examples), and one or more input/output (I/O) interfaces 108, coupled to one another via one or more buses and/or other connections. For instance, processors 104, 105 and memory 106 are coupled to I/O interfaces 108 via one or more buses 110, and processors 104, 105 are coupled to one another and memory 106 via one or more buses 111. Note that, in one or more embodiments, AI accelerator 105 can be a specialized hardware accelerator or processor designed to, at least in part, accelerator machine learning computations, and thereby improve processor performance and reduce cost in deploying machine-learning-based applications.

Bus 111 is, for instance, a memory or cache coherence bus, and bus 110 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special-purpose processors (e.g., AI accelerators or neural network accelerators) can be separate from but coupled to one or more general-purpose processors and/or can be embedded within one or more general-purpose processors (as illustrated). Many variations are possible.

Memory 106 can include, for instance, a cache 112, such as a shared cache, which may be coupled to local caches 114 of processors 104 and/or AI accelerator 105, via, e.g., one or more buses 111. Further, memory 106 can include one or more programs or applications 116 and at least one operating system 118. An example operating system includes an IBM® z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 can also include one or more computer readable program instructions 120, which can be configured to carry out functions of embodiments of aspects of the invention.

Moreover, in one or more embodiments, memory 106 includes processor firmware 122. Processor firmware includes, e.g., the microcode or millicode of a processor. It includes, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 102 can communicate via, e.g., I/O interfaces 108 with one or more external devices 130, such as a user terminal, a tape drive, a pointing device, a display, and one or more data storage devices 134, etc. A data storage device 134 can store one or more programs 136, one or more computer readable program instructions 138, and/or data, etc. The computer readable program instructions can be configured to carry out functions of embodiments of aspects of the invention.

Computer system 102 can also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode or millicode, device drivers, redundant processing units, external disk drive arrays, RAID systems, tape drives, and data archival storage systems, etc.

Computer system 102 can be operational with numerous other general-purpose or special-purpose computing system environments or configurations. Examples of well-known computing systems, environments, and/or configurations that are suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
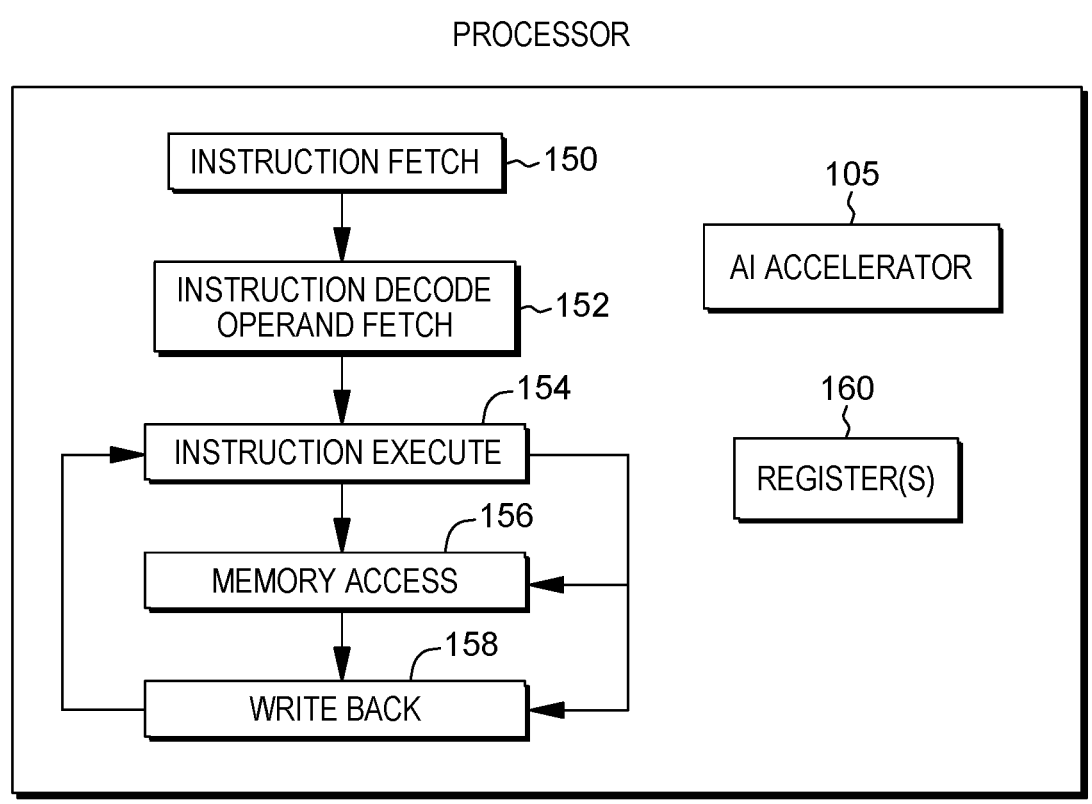
FIG. 1B depicts further details of a processor of FIG. 1A, in accordance with one or more aspects of the present invention.

In one example, a processor (e.g., processor 104 and/or processor 105) includes a plurality of functional components (or a subset thereof) used to execute instructions and/or operations. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components can access and/or use one or more registers 160 in instruction processing. Further, one or more of the processors can, in accordance with one or more aspects of the present invention, include an artificial intelligence (AI) accelerator 105 with accelerator-related processing, such as described herein.

In one or more implementations, mixed-precision is the use of different data format types, such as different floating-point types, such as 16-bit and 32-bit, in an artificial intelligence model during training to make the model run faster and use less memory. Artificial intelligence (AI) frameworks, such as TensorFlow™ (created by Google, Inc. of Mountain View, Calif., USA) support mixed-precision among different devices. Further, as discussed herein, a processor (such as a central processing unit (CPU)), can have associated therewith an accelerator, such as an AI accelerator, which provides faster, lower-precision computations, such as machine learning computations. In one embodiment, one or more AI accelerators can be integrated within the processor, such as part of a single, mixed-precision processing device. For instance, in one embodiment, a 32-bit floating-point (FP32) processor can contain an AI accelerator that provides 16-bit floating-point computations. For training and inference on such a processor, certain computations can be optimized to 16-bit computations on the AI accelerator, while other 32-bit computations remain on the processor. Note that there are multiple different 16-bit floating-point data formats, and different manufacturers can define different floating-point types, such as a custom floating-point 16-bit (CF16) data type which includes 6 exponent bits and 9 fraction bits. Note that this is one example only of a lower-precision accelerator data format that can be included within, or associated with, a processor of higher-precision data format.

For the processor, with a processor data format (such as 32-bit floating-point (FP32) data format) incorporating an AI accelerator with an accelerator data format (such as custom 16-bit floating-point (CF16) data format), certain operations can be optimized to run on the AI accelerator for better performance. Artificial intelligence frameworks, such as TensorFlow™, typically do not support a custom 16-bit floating-point data format, and do not know whether a next operation in a process (e.g., AI model) is on the AI accelerator or the processor. In one or more implementations, the AI accelerator is thus configured to perform multiple steps which include: first converting received data from processor data format (e.g., 32-bit floating-point (FP32) type format) to accelerator data format (e.g., 16-bit floating-point (CF16) type format); performing an operation on the AI accelerator; and converting the resultant data from accelerator data format back to processor data format after performing the operation. The conversions between the lower-precision accelerator data format (e.g., CF16) and the higher-precision processor data format (e.g., FP32) thus occur repeatedly for data being processed by the accelerator, and represent a certain amount of overhead of a mixed-precision training or inference processing device, such as discussed herein.

Figure 2A:
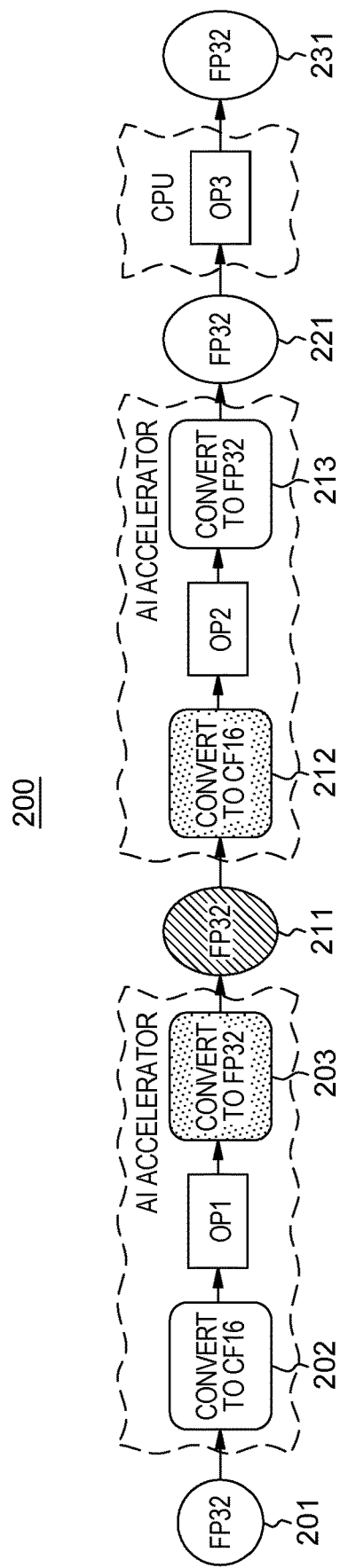
FIG. 2A is a partial depiction of one embodiment of operations of a process to run on a processor and associated accelerator, which is to have data format conversion processing reduced, in accordance with one or more aspects of the present invention.

FIG. 2A depicts one embodiment of operations (e.g., OP1, OP2, OP3) a process 200 to run on a processor and associated accelerator, where it is desirable to reduce data format conversion processing, in accordance with one or more aspects described herein. In this example, the processor data format is assumed to be 32-bit floating-point (FP32) type format, and the accelerator data format is assumed to be custom 16-bit floating-point (CF16) type format. Note that this is one example only, and that the concepts disclosed herein apply to a wide variety of different processor and accelerator data formats.

Referring to FIG. 2A, data in processor data format (FP32) 201 is input to the AI accelerator, which converts the input data to accelerator data format (CF16) 202 in order to perform an operation (OP1) of the process on the AI accelerator. The resultant data is then converted from accelerator data format back to processor data format (FP32) 203 and provided as output data 211 in processor data format. In this example, a next operation (OP2) of process 200 also occurs on the AI accelerator. Thus, the output data in processor data format (CF16) 211 is converted by the AI accelerator to accelerator data format 212 for performing the next operation OP2 on the AI accelerator. After performing operation OP2, the AI accelerator converts the resultant data from accelerator data format back to processor data format (FP32) 213 for providing, in this example, resultant data 221 in processor data format back to the processor, which performs a next operation (OP3) in process 200, producing resultant data 231 in processor data format (FP32). In one example, operations OP1, OP2 performed on the AI accelerator can be AI-related computations, such as computations on matrices or tensors. As discussed, there is a floating-point conversion both before and after each operation on the AI accelerator. Disclosed herein is, in one or more embodiments, program code is provided to optimize processing within a single, mixed-precision device, such as disclosed herein, by selectively reducing data format conversion processing. An example of this is depicted in FIG. 2B.

Figure 2B:
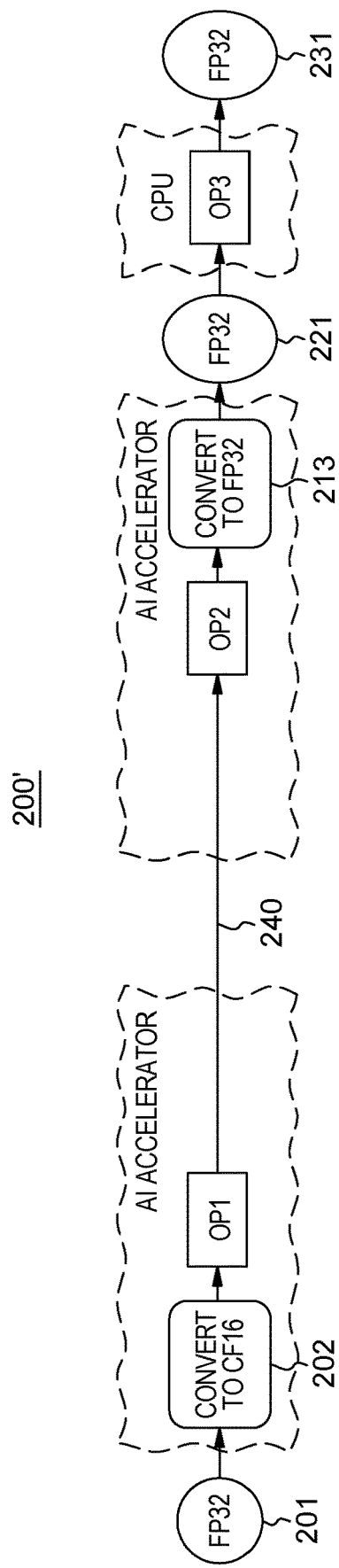
FIG. 2B depicts the example of FIG. 2A, with multiple data format conversions blocked, or removed, where adjoining operations of the process are to run on the accelerator, in accordance with one or more aspects of the present invention.

Referring to FIG. 2B, process 200 of FIG. 2A is again illustrated, with selected data format conversion processing having been removed, where two adjoining or neighboring operations of the process are both on the AI accelerator. In the illustrated case, the output conversion of the source operation (e.g., OP1) and the input conversion of the destination operation (e.g., OP2) are removed, meaning that the resultant data from OP1 remains in accelerator data format (e.g., CF16) and is provided as input data to operation OP2 to run on the AI accelerator. In this manner, data format conversion processing of the accelerator is reduced, enhancing processing within the computing environment and improving overall performance by reducing accelerator training and/or inference processing time.

Figure 3:
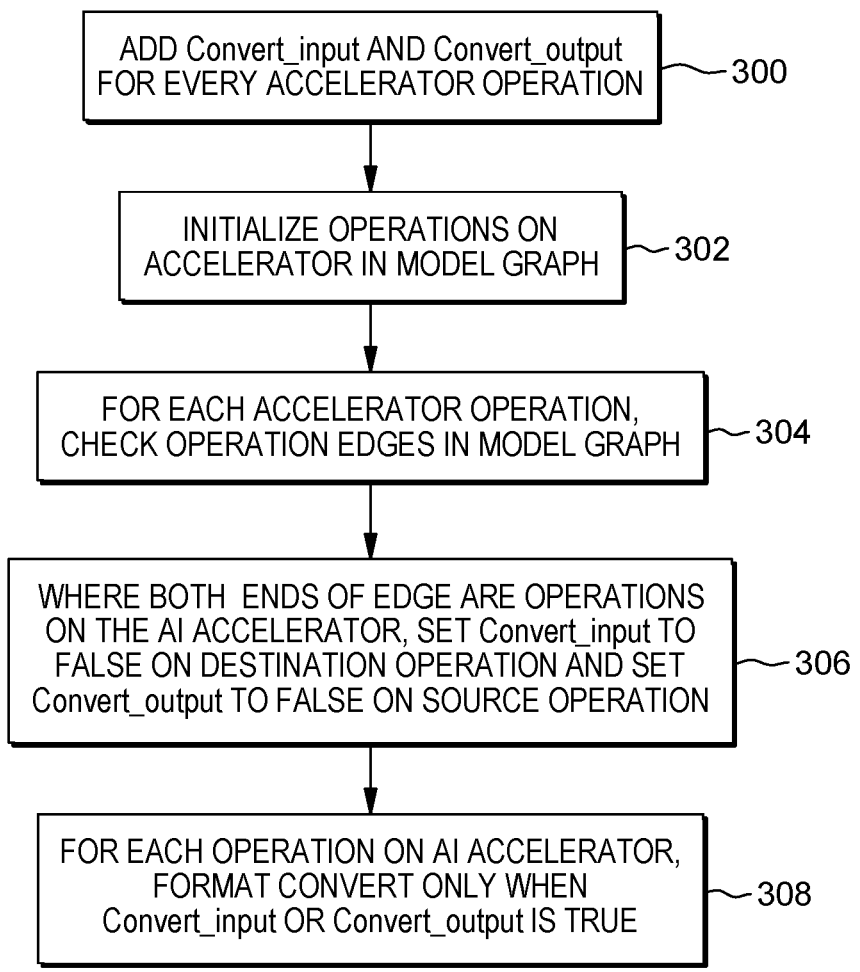
FIG. 3 depicts one embodiment of a workflow illustrating certain aspects of one or more embodiments of the present invention.

FIG. 3 depicts one embodiment of a workflow illustrating certain aspects of one or more embodiments of the present invention. In one embodiment, format conversion in an artificial intelligence (AI) model is reduced by adding or associating convert_input and convert_output parameters to the conversion operations for, for instance, every accelerator operation 300 in the model. In one implementation, the parameters are either TRUE, meaning data format conversion processing proceeds, or FALSE, meaning that data format conversion processing is blocked, or removed. As depicted, the operations on the accelerator are initialized in the model graph 302, and for each accelerator operation, the operation edges in the model graph are checked 304. This check is to determine whether two adjoining operations of a process are to be run on the accelerator. Where both ends of an edge are operations on the accelerator, then the convert_input parameter is set to FALSE on the destination operation, and the convert_output parameter is set to FALSE for the source operation 306. For each operation on the accelerator, data format conversion thus only proceeds when the convert_input or convert_output parameter is TRUE for an operation on the accelerator 308. An example of the workflow is depicted in FIGS. 4A & 4B.

Figure 4A:
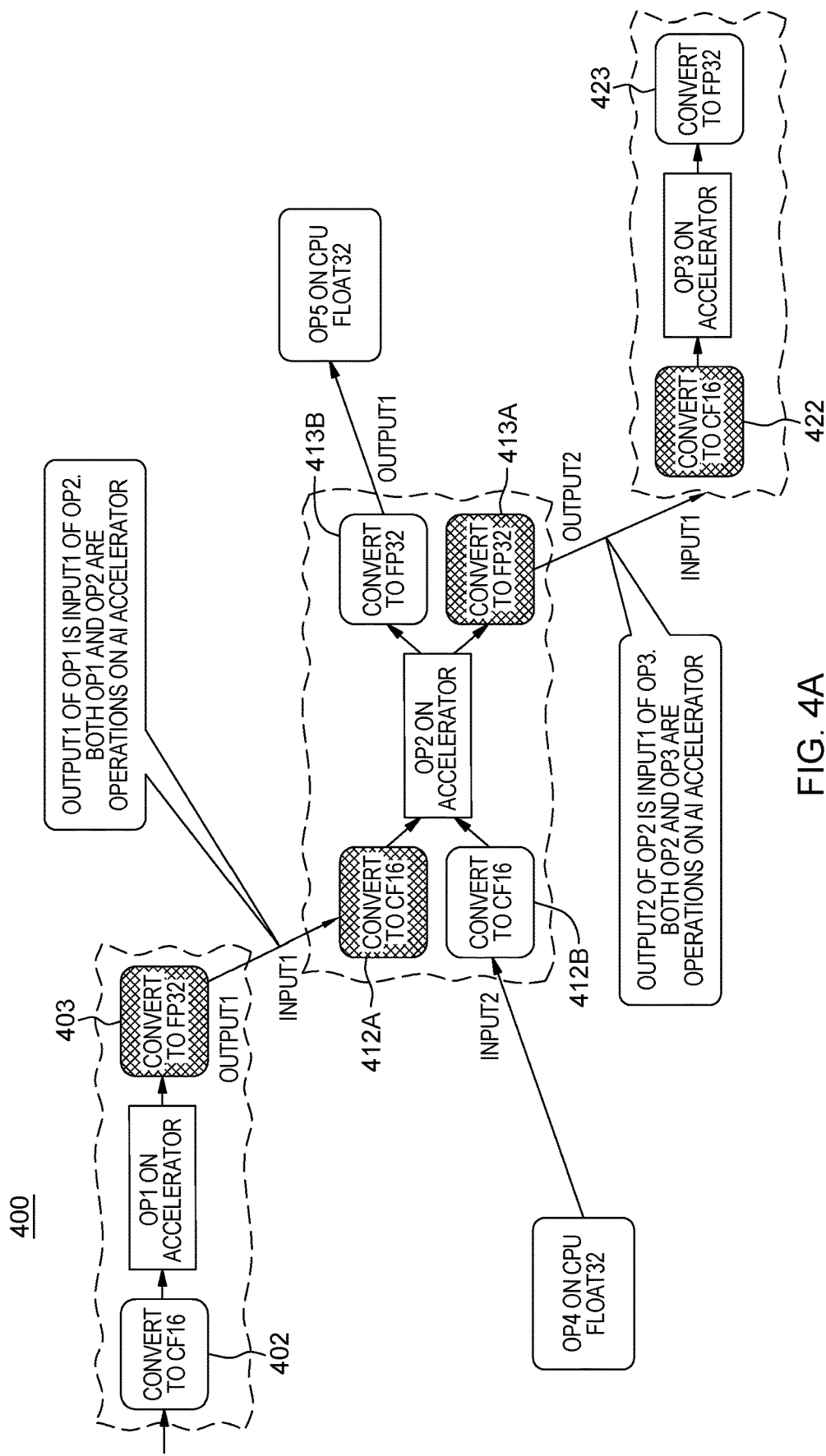
FIG. 4A depicts a further example of operations of a process to run on a processor and associated accelerator, where one accelerator operation, OP2, includes multiple data inputs, each from a different source operation, and multiple data outputs, each to a different destination operation, with data format conversion processing to be reduced, in accordance with one or more aspects of the present invention.

Referring to FIG. 4A, a process 400 is illustrated to run on a processor (or CPU) with a processor data format of, for instance, 32-bit floating-point (FP32) type format, and an associated accelerator with a lower-precision, 16-bit custom floating-point (CF16) type data format. Note that these data formats are provided by way of example only. In process 400, one operation (OP1) runs on the accelerator and includes an input data format conversion to convert from processor data format (FP32) to accelerator format (CF16) 402. Data output from OP1 is then converted from the accelerator data format (CF16) back to processor data format (FP32) for forwarding as input data (e.g., input 1) to an adjoining operation (OP2), which is also to execute on the accelerator. In this example, operation OP2 runs on the accelerator and includes inputs from multiple operations, such as OP1 running on the accelerator, as well as OP4 running on the processor. Both inputs are received in processor data format (FP32), which is then converted to accelerator data format (CF16) 412A, 412B, for performance of operation OP2 on the accelerator. In this example, data output from operation OP2 includes an output 1, which is converted to processor data format 413B (FP32) for provision to the processor, and in particular, to an operation (OP5) to run on the processor, and includes an output 2, which is converted to processor data format 413A (FP32) for provision to an operation (OP3) to run on the accelerator. Output 2 is provided as input 1 to operation OP3, which converts the input data from processor data format to accelerator data format (CF16) 422 to perform operation OP3 on the accelerator. The resultant data is then converted back to processor data format (FP32) 423 and, for instance, forwarded to a next operation (not shown) in process 400.

As highlighted in FIG. 4A, there are certain data format conversions for adjoining operations OP1 and OP2, as well as for adjoining operations OP2 and OP3 to execute on the accelerator, that are unnecessary. Data format conversion processing can thus be reduced by removing these conversions, since both the source operation and the destination operation in the dataflow for those data paths are to run on the accelerator.

Figure 4B:
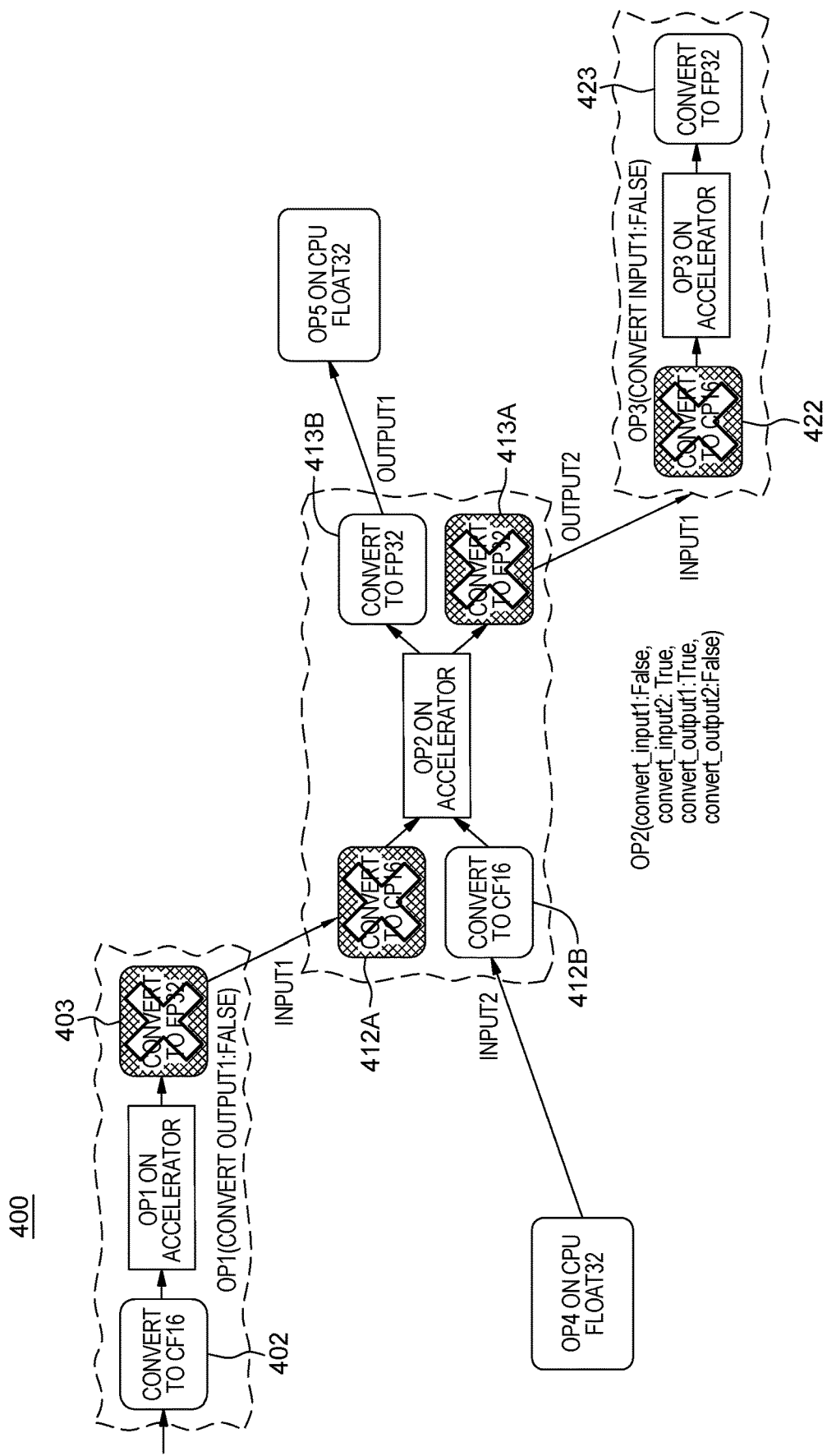
FIG. 4B depicts the example of FIG. 4A, with selected data format conversions blocked, or removed, in accordance with one or more aspects of the present invention.

As illustrated in FIG. 4B, the noted data format conversions are identified for removal, in one embodiment, by setting the convert_output parameter associated with the source operations (OP1, OP2) equal to FALSE, and by setting the convert_input parameters associated with the destination operations (OP2, OP3) equal to FALSE. In this example, the remaining convert_input parameters and convert_output parameters stay TRUE. As noted, in one embodiment, format conversion proceeds only when the convert_input or convert_output is TRUE for a particular operation on the AI accelerator.

Figure 5:
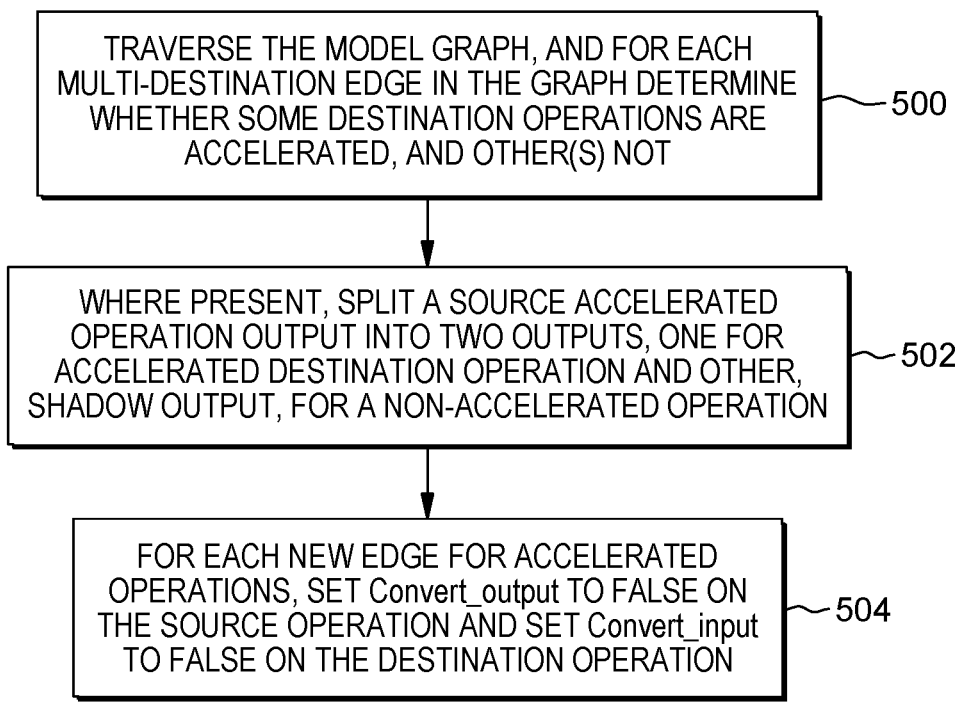
FIG. 5 depicts a further embodiment of a workflow illustrating certain aspects of one or more embodiments of the present invention, in accordance with one or more aspects of the present invention.

In one or more embodiments, resultant data from an operation running on the accelerator can be provided to two further operations of a process (e.g., AI model), one of which is to also execute on the accelerator, and the other of which is to execute on the processor. Pursuant to one or more aspects of the present invention, the resultant data in this example is split, or copied, to provide one data output to the operation to run on the accelerator, and another data output to the operation to run on the processor. In one example, the resultant data is the same in both outputs, referred to as output 1 and shadow_output 1, with the only difference being the status of the convert_output parameter associated with the data. FIG. 5 illustrates one embodiment of a workflow associated with this aspect of the present invention.

Figure 6:
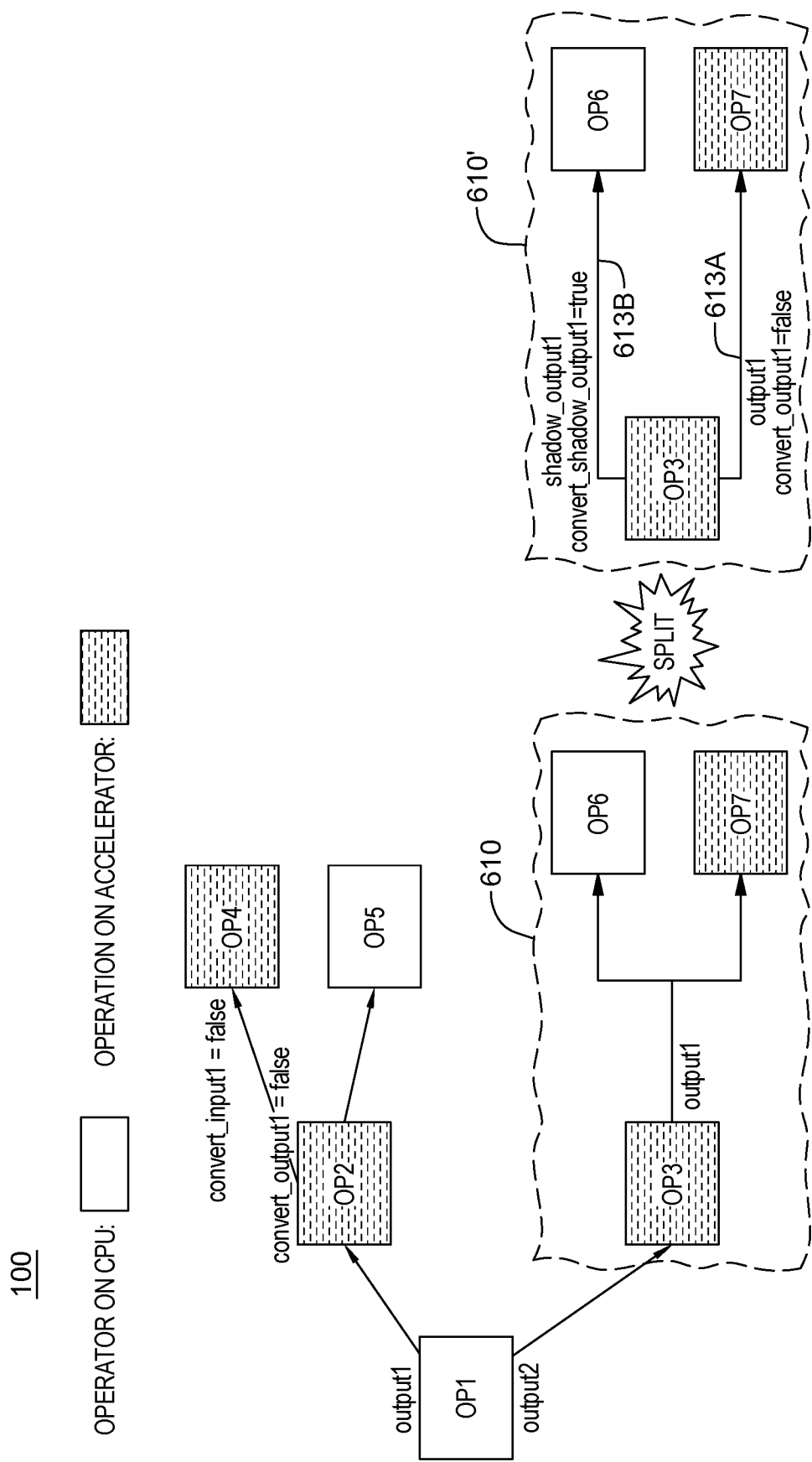
FIG. 6 depicts another example of operations of a process to run on a processor and associated accelerator, which is to have data format conversion processing reduced, in accordance with one or more aspects of the present invention.

As illustrated in FIG. 5, in one embodiment, the process includes traversing the AI model graph, and for each multi-destination edge in the graph, determining whether one or more destination operations are accelerated (i.e., to be processed by the accelerator), and others are not (i.e., to be processed by the processor) 500. Where both are present, the source-accelerated node (or source operation) output is split into (for instance) two, one output for the accelerated operation, and the other, shadow_output, for the non-accelerated operation (i.e., for the processor operation) 502. For each new edge of adjoining accelerator operations, the convert_output parameter is set to FALSE on the source operation, and the convert_input parameter is set to FALSE on the destination operation 504. An example of this process is depicted in FIG. 6, where a process 600 includes multiple operations OP1-OP7, certain of which are to run on the processor OP1, OP5, OP6, and others of which are to run on the accelerator, OP2, OP3, OP4 & OP7. As illustrated, in accordance with one or more aspects of the present invention, output 1 from operation OP3 to run on the accelerator is split (or copied) to form output 1 613A that is provided to destination operation OP7 to run on the accelerator, and shadow_output 1 613B is provided to destination operation OP6 that is to run on the processor. Thus, a portion 610 of the depicted process has an output expanded to form portion 610' of the process, where the output and shadow_output each have a respective data format conversion parameter. In the embodiment illustrated, the convert_output 1 parameter is FALSE since operation OP7 is to run on the accelerator, and the convert_shadow_output 1 parameter is TRUE since operation OP6 is to run on the processor.

Advantageously, reduction in data format conversion processing of the accelerator enhances processing within the computing environment, and improves overall performance by reducing accelerator processing, which reduces accelerator training or inference processing time, and enhances throughput. Disclosed herein is a process for selectively reducing, for instance, data format conversion processing to optimize artificial intelligence (AI) training and inference processing for, for instance, a mixed-precision processing environment including a processor and associated AI accelerator. In one or more embodiments, the AI model is traversed to determine neighboring or adjoining operations in order to optimize the AI training and inference processing for the processor and AI accelerator. In one embodiment, a shadow_output (or duplicate output) can be obtained to facilitate mixed-precision processing in the AI model graph. With the optimization processing disclosed herein, a single, mixed-precision device with a processor and an AI accelerator can have better performance for AI training and inference processing. Depending on the model, a significant number of data format conversions can be removed, or blocked, which advantageously reduces time of AI training and inference processing, as well as reduces memory needed for AI training and inference processing.

Further details of one embodiment of facilitating processing within a computing environment, as it relates to one or more aspects of the present invention, are described with reference to FIGS. 7A-7B.

Referring to FIG. 7A, in one embodiment, data format conversion processing of an accelerator accessed by a processor of a computing environment is reduced, where the processor and accelerator use different data formats, and the accelerator is configured to perform, in part, an input data format conversion to convert received data from a processor data format to an accelerator data format prior to performing an operation using the data, and an output data format conversion to convert resultant data from the accelerator data format back to the processor data format after performing the operation 700. The reducing includes determining that adjoining operations of a process to run on the processor and accelerator are to be performed on the accelerator, where the adjoining operations include a source operation and a destination operation 702, and identifying for removal, based on the determining, output data format conversion of the output data of the source operation for input to the destination operation as input data, and input data format conversion of the input data for the destination operation 704.

In one embodiment, the reducing further includes removing, based on the identifying, the output data format conversion of output data of the source operation for input to the destination operation as input data, and the input data format conversion of the input data for the destination operation 706.

In one embodiment, a respective convert_input parameter is associated with input data format conversions of the accelerator, and a respective convert_output parameter is associated with output data format conversions of the accelerator, and the identifying includes setting the convert_output parameter associated with the output data format conversion of the output data for the source operation to FALSE, and setting the convert_input parameter associated with the input data format conversion of the input data for the destination operation to FALSE. The reducing includes, blocking the output data format conversion of the output data from the source operation based on the convert_output parameter being FALSE, and blocking the input data format conversion of the input data for the destination operation based on the convert_input parameter being FALSE 708.

As illustrated in FIG. 7B, in another example, the destination operation receives multiple input data from multiple sources, one source of the multiple sources being the adjoining source operation to be performed on the accelerator, and the other source of the multiple sources being an operation to execute on the processor, where the input data received from the processor is to undergo input data format conversion, while the input data received from the accelerator is not to undergo input data format conversion 710.

In one embodiment, the destination operation provides multiple data outputs, with one data output of the multiple data outputs having a respective convert_output parameter associated therewith that is TRUE, meaning that the output is to undergo output data format conversion to convert from accelerator data format to processor data format, and another output of the multiple data outputs has a respective convert_output parameter that is FALSE, meaning that the output is not to undergo output data format conversion to convert from the accelerator data format to the processor data format 712.

In another embodiment, the multiple data outputs of the destination operation are provided by copying (e.g., repeating or shadowing) a data output to provide the one data output for an operation on the processor, and the other data output for an operation on the accelerator 714.

In one example, the processor data format is a higher-precision data format than the accelerator data format 716. In a specific example, the processor data format is a first floating-point data format, and the accelerator data format is a second floating-point data format 718.

In one or more embodiments, the accelerator is an artificial intelligence (AI) accelerator associated with the processor, and along with the processor, part of a single, mixed-precision processing device 720.

Other variations and embodiments are possible.

Figure 8A:
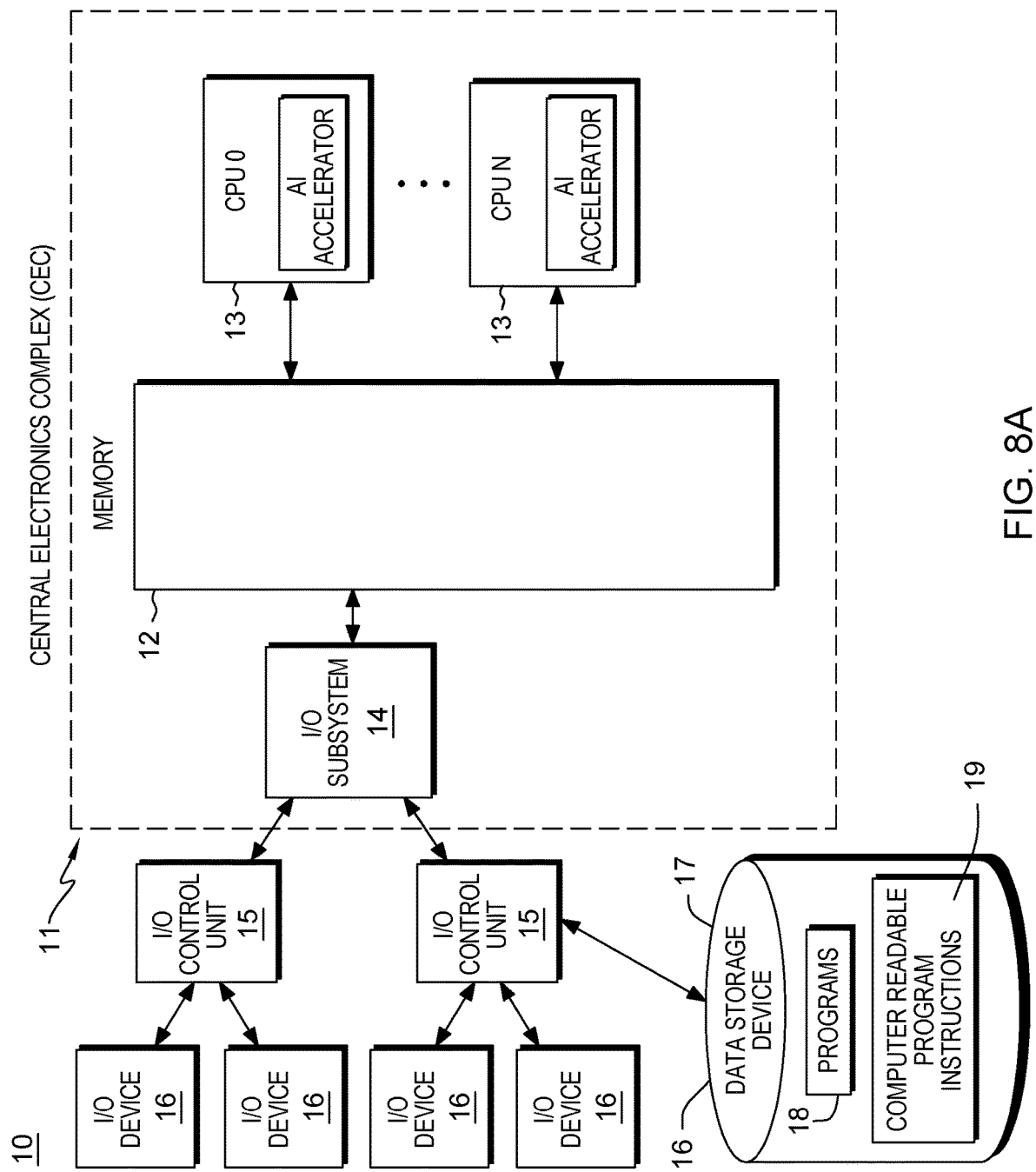
FIG. 8A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 8A. As an example, the computing environment of FIG. 8A is based on the z/Archhitecture® instruction set architecture offered by International Business Machines Corporation, Armonk, N.Y. The z/Architecture instruction set architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors, such as one or more general-purpose processors (a.k.a., central processing units (CPUs) 13) and one or more special-purpose processors (e.g., neural network processor 31), and to an input/output (I/O) sub system 14.

As examples, the one or more special-purpose processors may be separate from the one or more general-purpose processors and/or at least one special-purpose processor may be embedded within at least one general-purpose processor. Other variations are also possible.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode or millicode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8C:
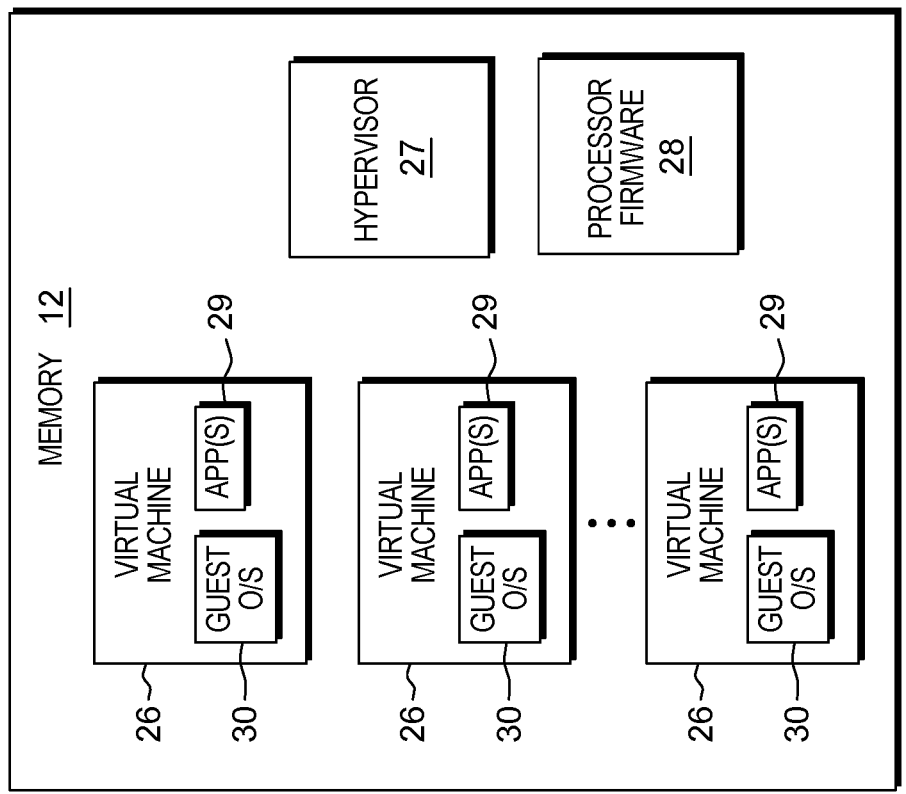
FIG. 8C depicts another example of further details of a memory of FIG. 8A, in accordance with one or more aspects of the present invention.
Figure 8B:
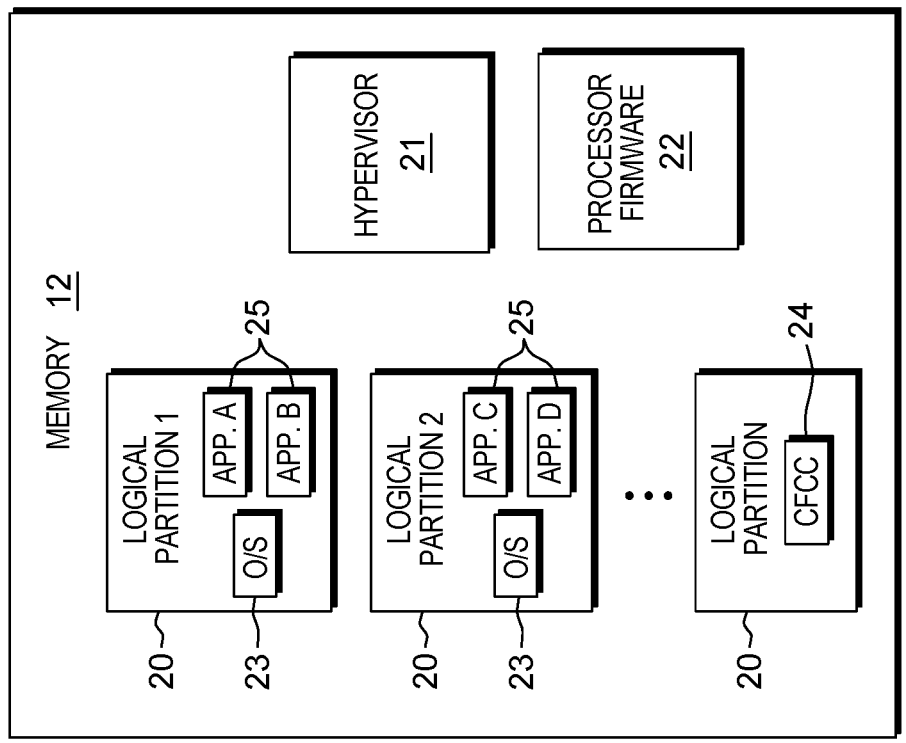
FIG. 8B depicts one examples of further details of a memory of FIG. 8A, in accordance with one or more aspects of the present invention.

Central electronics complex 11 provides in one or more embodiments logical partitioning and/or virtualization support. In one embodiment, as shown in FIG. 8B, memory 12 includes, for example, one or more logical partitions 20, a hypervisor 21 that manages the logical partitions, and processor firmware 22. One example of hypervisor 21 is the IBM® Processor Resource/System Manager (PR/SM™), offered by International Business Machines Corporation, Armonk, N.Y. IBM and PR/SM are a trademark or registered trademark of International Business Machines Corporation in at least one jurisdiction.

Each logical partition 20 is capable of functioning as a separate system. That is, each logical partition can be independently reset, run a guest operating system 23 such as the IBM® z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to, e.g., CPUs 13 (FIG. 8A), which are physical processor resources that can be allocated to the logical partitions. For instance, a logical partition 20 may include one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 8C, memory 12 of central electronics complex 11 includes, for example, one or more virtual machines 26, a virtual machine manager, such as a hypervisor 27, that manages the virtual machines, and processor firmware 28. One example of hypervisor 27 is the IBM® z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 9A:
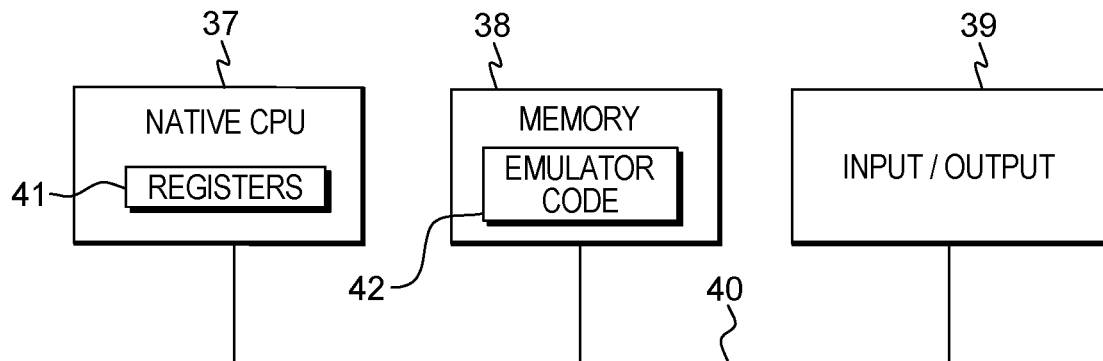
FIG. 9A depicts yet another example of a computing environment to incorporate and use one or more aspects of the present invention.

Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a Power® processor offered by International Business Machines Corporation, Armonk, N.Y.; an HP Superdome with Intel® processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as Power processors, HP Superdome servers or others, to emulate the z/Architecture instruction set architecture and to execute software and instructions developed based on the z/Architecture instruction set architecture.

Figure 9B:
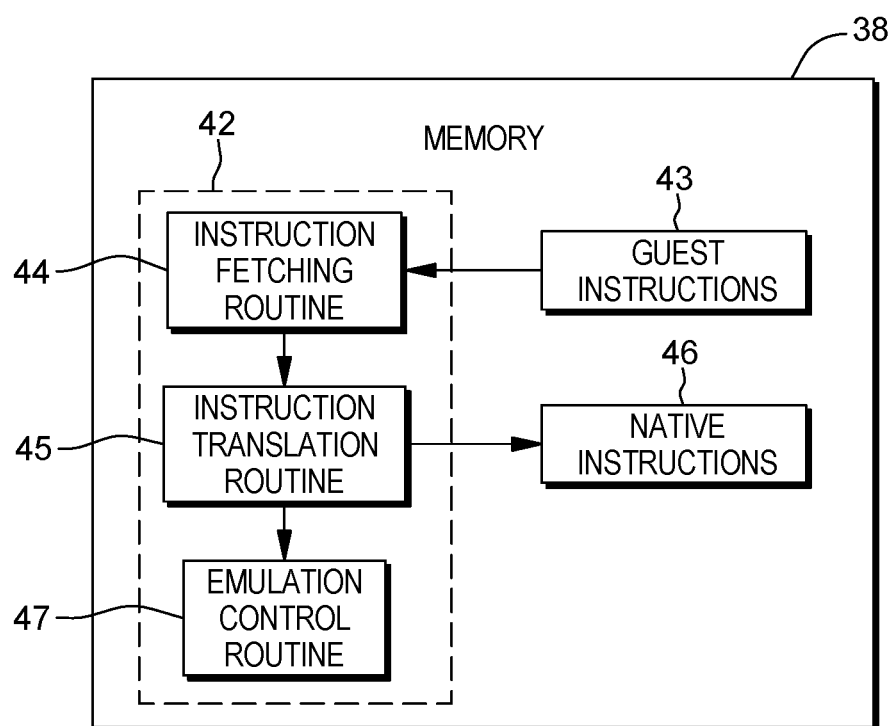
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
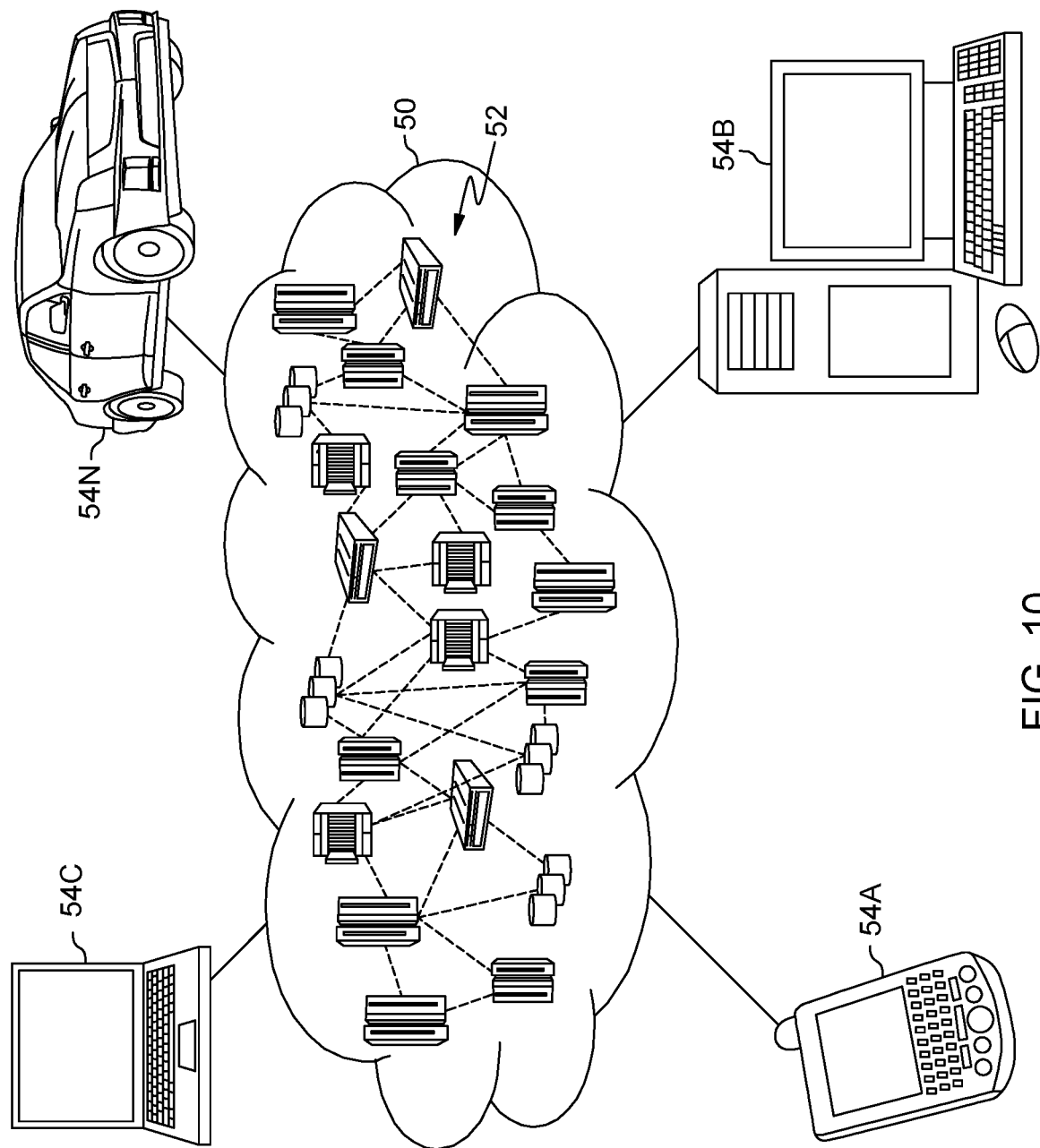
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
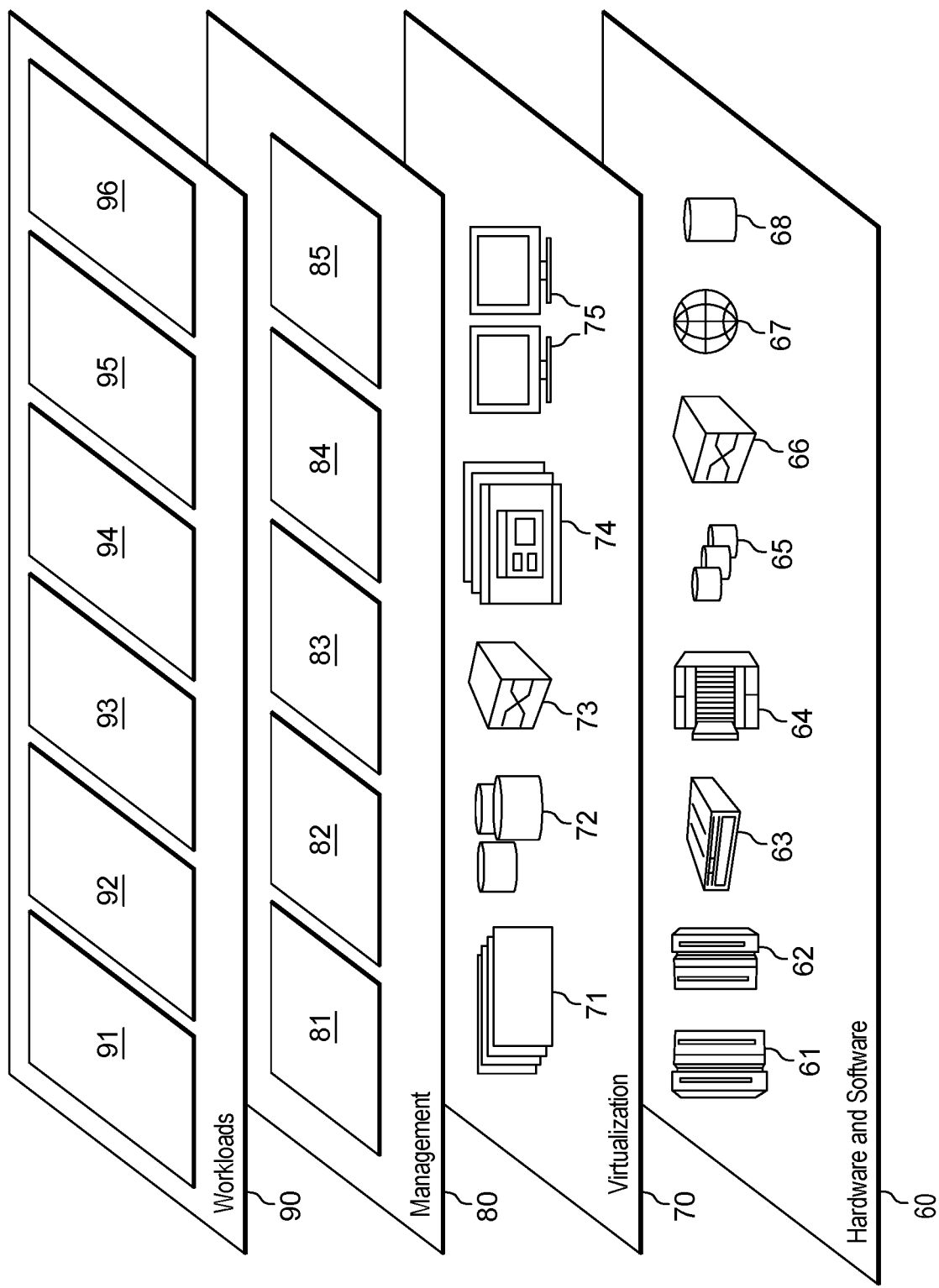
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and accelerator assist processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
one or more computer-readable storage medium having program instructions embodied therewith, the program instructions being readable by a processing circuit to cause the processing circuit to perform a method comprising:
reducing data format conversion processing of an accelerator accessed by a processor of the computing environment, the processor and accelerator using different data formats, and the accelerator being configured to perform, in part, an input data format conversion to convert received data from a processor data format to an accelerator data format prior to performing an operation using the data, and an output data format conversion to convert resultant data from the accelerator data format back to the processor data format after performing the operation, the reducing comprising:
determining that adjoining operations of a process to run on the processor and accelerator are to be performed by the accelerator, the adjoining operations including a source operation and a destination operation;
identifying for removal, based on the determining, output data format conversion of output data of the source operation for input to the destination operation as input data, and input data format conversion of the input data for the destination operation; and
associating a respective convert_input parameter with input data format conversions of the accelerator, and a respective convert_output parameter with output data format conversions of the accelerator, wherein the identifying comprises setting the convert_output parameter associated with the output data format conversion of the output data from the source operation to FALSE, and setting the convert_input parameter associated with the input data format conversion of the input data for the destination operation to FALSE, and wherein the reducing comprises blocking the output data format conversion of the output data from the source operation based on the convert_output parameter being FALSE, and blocking the input data format conversion of the input data for the destination operation based on the convert_input parameter being FALSE.

2. The computer program product of claim 1, wherein the reducing further comprises removing, based on the identifying, the output data format conversion of output data of the source operation for input to the destination operation as input data, and the input data format conversion of the input data for the destination operation.

3. The computer program product of claim 1, wherein the destination operation receives multiple input data from multiple sources, one source of the multiple sources being the adjoining source operation to be performed by the accelerator, and another source of the multiple sources being an operation to execute on the processor, wherein the input data received from the processor is to undergo input data format conversion by the accelerator, while the input data received from the accelerator is not to undergo input data format conversion by the accelerator.

4. The computer program product of claim 1, wherein the destination operation provides multiple data outputs, one data output of the multiple data outputs having a respective convert_output parameter associated therewith that is TRUE, meaning that the output is to undergo output data format conversion to convert from accelerator data format to processor data format, and another output of the multiple data outputs has a respective convert_output parameter that is FALSE, meaning that that output is not to undergo output data format conversion to convert from the accelerator data format to the processor data format.

5. The computer program product of claim 4, wherein the multiple data outputs of the destination operation are provided by copying a data output to provide the one data output to be provided to an operation on the processor and the other data output to be provided to an operation on the accelerator.

6. The computer program product of claim 1, wherein the processor data format is a higher-precision data format than the accelerator data format.

7. The computer program product of claim 6, wherein the processor data format is a first floating-point data format, and the accelerator data format is a second floating-point data format.

8. The computer program product of claim 1, wherein the accelerator is an artificial intelligence (AI) accelerator associated with the processor, and along with the processor, part of a single, mixed-precision processing device.

9. A computer system for facilitating processing within a computing environment, the computer system comprising:
a memory; and
a processing circuit in communication with the memory, wherein the computer system is configured to perform a method, the method comprising:
reducing data format conversion processing of an accelerator accessed by a processor of the computing environment, the processor and accelerator using different data formats, and the accelerator being configured to perform, in part, an input data format conversion to convert received data from a processor data format to an accelerator data format prior to performing an operation using the data, and an output data format conversion to convert resultant data from the accelerator data format back to the processor data format after performing the operation, the reducing comprising:
determining that adjoining operations of a process to run on the processor and accelerator are to be performed by the accelerator, the adjoining operations including a source operation and a destination operation;
identifying for removal, based on the determining, output data format conversion of output data of the source operation for input to the destination operation as input data, and input data format conversion of the input data for the destination operation; and
associating a respective convert_input parameter with input data format conversions of the accelerator, and a respective convert_output parameter with output data format conversions of the accelerator, wherein the identifying comprises setting the convert_output parameter associated with the output data format conversion of the output data from the source operation to FALSE, and setting the convert_input parameter associated with the input data format conversion of the input data for the destination operation to FALSE, and wherein the reducing comprises blocking the output data format conversion of the output data from the source operation based on the convert_output parameter being FALSE, and blocking the input data format conversion of the input data for the destination operation based on the convert_input parameter being FALSE.

10. The computer system of claim 9, wherein the reducing further comprises removing, based on the identifying, the output data format conversion of output data of the source operation for input to the destination operation as input data, and the input data format conversion of the input data for the destination operation.

11. The computer system of claim 10, wherein the destination operation receives multiple input data from multiple sources, one source of the multiple sources being the adjoining source operation to be performed by the accelerator, and another source of the multiple sources being an operation to execute on the processor, wherein the input data received from the processor is to undergo input data format conversion by the accelerator, while the input data received from the accelerator is not to undergo input data format conversion by the accelerator.

12. The computer system of claim 10, wherein the destination operation provides multiple data outputs, one data output of the multiple data outputs having a respective convert_output parameter associated therewith that is TRUE, meaning that the output is to undergo output data format conversion to convert from accelerator data format to processor data format, and another output of the multiple data outputs has a respective convert_output parameter that is FALSE, meaning that that output is not to undergo output data format conversion to convert from the accelerator data format to the processor data format.

13. The computer system of claim 12, wherein the multiple data outputs of the destination operation are provided by copying a data output to provide the one data output to be provided to an operation on the processor and the other data output to be provided to an operation on the accelerator.

14. The computer system of claim 9, wherein the processor data format is a higher-precision data format than the accelerator data format, and wherein the wherein the processor data format is a first floating-point data format, and the accelerator data format is a second floating-point data format.

15. A computer-implemented method of facilitating processing within a computing environment, the computer-implemented method comprising:
reducing data format conversion processing of an accelerator accessed by a processor of the computing environment, the processor and accelerator using different data formats, and the accelerator being configured to perform, in part, an input data format conversion to convert received data from a processor data format to an accelerator data format prior to performing an operation using the data, and an output data format conversion to convert resultant data from the accelerator data format back to the processor data format after performing the operation, the reducing comprising:
determining that adjoining operations of a process to run on the processor and accelerator are to be performed by the accelerator, the adjoining operations including a source operation and a destination operation;
identifying for removal, based on the determining, output data format conversion of output data of the source operation for input to the destination operation as input data, and input data format conversion of the input data for the destination operation; and
associating a respective convert_input parameter with input data format conversions of the accelerator, and a respective convert_output parameter with output data format conversions of the accelerator, wherein the identifying comprises setting the convert_output parameter associated with the output data format conversion of the output data from the source operation to FALSE, and setting the convert_input parameter associated with the input data format conversion of the input data for the destination operation to FALSE, and wherein the reducing comprises blocking the output data format conversion of the output data from the source operation based on the convert_output parameter being FALSE, and blocking the input data format conversion of the input data for the destination operation based on the convert_input parameter being FALSE.

16. The computer-implemented method of claim 15, wherein the destination operation receives multiple input data from multiple sources, one source of the multiple sources being the adjoining source operation to be performed by the accelerator, and another source of the multiple sources being an operation to execute on the processor, wherein the input data received from the processor is to undergo input data format conversion by the accelerator, while the input data received from the accelerator is not to undergo input data format conversion by the accelerator.

17. The computer-implemented method of claim 15, wherein the destination operation provides multiple data outputs, one data output of the multiple data outputs having a respective convert_output parameter associated therewith that is TRUE, meaning that the output is to undergo output data format conversion to convert from accelerator data format to processor data format, and another output of the multiple data outputs has a respective convert_output parameter that is FALSE, meaning that that output is not to undergo output data format conversion to convert from the accelerator data format to the processor data format.

\* \* \* \* \*